United States Patent
Weissenmayer

(10) Patent No.: US 11,072,336 B2
(45) Date of Patent: Jul. 27, 2021

(54) METHOD AND DEVICE FOR IDENTIFYING A ROAD CONDITION

(71) Applicant: Robert Bosch GmbH, Stuttgart (DE)

(72) Inventor: Simon Weissenmayer, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 16/392,159

(22) Filed: Apr. 23, 2019

(65) Prior Publication Data
US 2019/0337520 A1 Nov. 7, 2019

(30) Foreign Application Priority Data
May 2, 2018 (DE) .......................... 102018206732.5

(51) Int. Cl.
| | |
|---|---|
| *B60W 40/02* | (2006.01) |
| *B60W 40/06* | (2012.01) |
| *G01N 27/22* | (2006.01) |
| *G01N 29/00* | (2006.01) |

(52) U.S. Cl.
CPC ............ *B60W 40/06* (2013.01); *G01N 27/223* (2013.01); *G01N 29/00* (2013.01); *B60W 2555/20* (2020.02)

(58) Field of Classification Search
USPC .......................................... 701/1, 29.1–34.4
See application file for complete search history.

(56) References Cited

U.S. PATENT DOCUMENTS

| | | | | |
|---|---|---|---|---|
| 4,810,022 A * | 3/1989 | Takagi | ................. | B62D 35/005 296/180.5 |
| 6,151,539 A * | 11/2000 | Bergholz | .............. | G01S 17/931 701/25 |
| 9,310,484 B2 * | 4/2016 | Lee | .......................... | G01S 15/87 |
| 9,821,659 B2 * | 11/2017 | Tran | ....................... | G01F 23/265 |
| 10,414,235 B1 * | 9/2019 | Yassan | ............... | B60G 17/0165 |
| 2014/0371976 A1 * | 12/2014 | Gilling | ................ | G01F 23/0076 701/29.1 |
| 2015/0005982 A1 * | 1/2015 | Muthukumar | ......... | G01P 15/00 701/1 |
| 2015/0046032 A1 * | 2/2015 | Clarke | .................... | G01S 15/00 701/37 |
| 2015/0046071 A1 * | 2/2015 | Clarke | ................ | G01F 23/2965 701/112 |
| 2015/0066339 A1 * | 3/2015 | Hoare | ................... | B60W 40/06 701/116 |
| 2016/0264142 A1 * | 9/2016 | Di Miro | ............ | B60W 50/0097 |
| 2016/0272066 A1 * | 9/2016 | Popham | ................. | G01B 21/18 |
| 2017/0052249 A1 * | 2/2017 | Bartsch | ................. | G01S 15/931 |
| 2017/0176592 A1 * | 6/2017 | Hoare | ............. | B60W 30/18009 |
| 2018/0265054 A1 * | 9/2018 | Hofmann | ................ | B60T 8/172 |
| 2019/0077406 A1 * | 3/2019 | Dudar | .................. | B60K 15/035 |

FOREIGN PATENT DOCUMENTS

| | | |
|---|---|---|
| DE | 102010063017 A1 | 6/2012 |
| DE | 102012221518 A1 | 5/2014 |
| DE | 102015015022 A1 | 5/2016 |

* cited by examiner

*Primary Examiner* — Jonathan L Sample
(74) *Attorney, Agent, or Firm* — Norton Rose Fulbright US LLP; Gerard Messina

(57) ABSTRACT

A method for identifying a road condition, in which a piece of road condition information representing the road condition is determined using a front end air moisture value representing an air moisture at a front end of a vehicle and a rear end air moisture value representing an air moisture at a rear end of the vehicle.

13 Claims, 1 Drawing Sheet

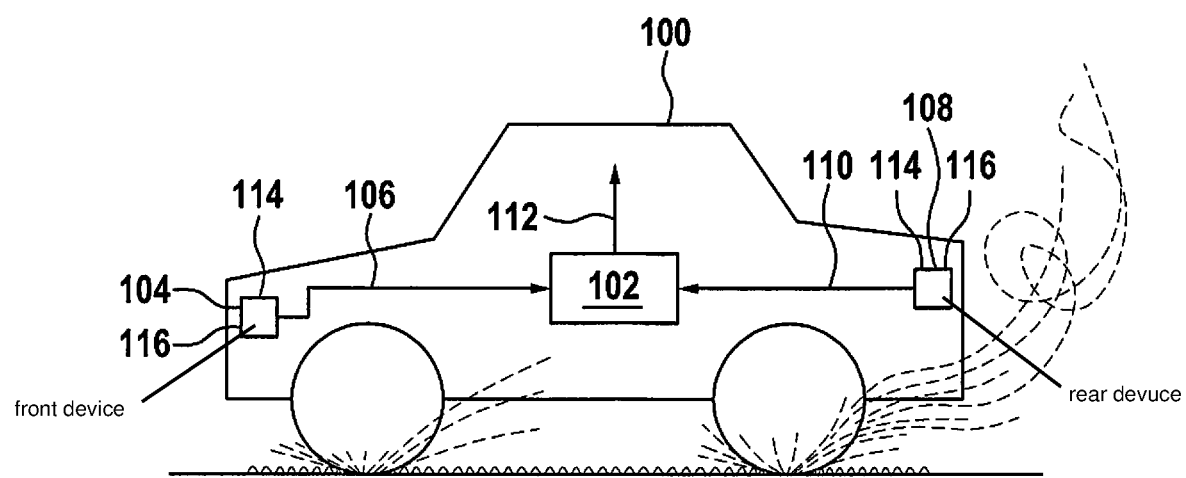

METHOD AND DEVICE FOR IDENTIFYING A ROAD CONDITION

CROSS REFERENCE

The present application claims the benefit under 35 U.S.C. § 119 of German Patent Application No. DE 102018206732.5 filed on May 2, 2018, which is expressly incorporated herein by reference in its entirety.

FIELD

The present invention relates to a method for identifying a road condition and a device for identifying a road condition.

BACKGROUND INFORMATION

Moisture on a front windshield of a vehicle may be identified using a rain sensor of a vehicle. The moisture in this case may be the result of precipitation or may be stirred up as spray water by other vehicles. If the front windshield is wet, it may be assumed that a road in the area of the vehicle is also wet. A road condition of the road may also be visually detected via a camera system of the vehicle.

SUMMARY

An example method for identifying a road condition and an example device for identifying a road condition, and finally a corresponding computer program product and a machine-readable memory medium, as provided in accordance with the present invention. Advantageous refinements of and improvements on the example embodiments of the present invention presented herein are result from the description herein.

SUMMARY

Specific embodiments of the present invention may advantageously enable spray water stirred up by a traveling vehicle to be identified, even when the spray water is stirred up only to a minimum height. Short moist passages may also be identified in this way.

A method is presented for identifying a road condition, which is characterized in that a piece of road condition information representing the road condition is determined using a front end air moisture value representing an air moisture at a front end of a vehicle and a rear end air moisture value representing an air moisture at a rear end of the vehicle.

Ideas for specific embodiments of the present invention may be considered to be based, among other things, on the description herein.

A road condition may be dry, moist, wet, very wet or covered by water. A piece of road condition information may reflect the road condition as a numerical value. The air moisture may be a relative air moisture. An air moisture value reflects the air moisture as a numerical value. The headers "front end" and "rear end" are used to differentiate otherwise identically named terms and features.

The road condition may be determined to be moist if the rear end air moisture value is greater than the front end moisture value. The ambient air ahead of the vehicle may be undisturbed. If the road is moist, the tires of the vehicle stir up spray water from the road. The spray water stirred up behind the travelling vehicle is pulled upward as a result of the aerodynamics of the vehicle. As a result, the air moisture behind the vehicle is greater than ahead of the vehicle. As the road dries out, the air is saturated with water near the road surface as a result of the evaporation, whereas the air becomes increasingly drier with increasing distance from the road. Thus, the air moisture increases with decreasing distance from the road surface. The aerodynamics stir up moist air layers located near the road surface behind the vehicle. As a result, the air moisture behind the vehicle is also higher than ahead of the vehicle.

The road condition may be determined to be dry if the rear end air moisture value and the front end air moisture value are approximately the same and each represent air moisture of less than 100%, in particular, less than 90% or preferably less than 50%. No spray water is stirred up when the road is dry. The air moisture is approximately the same ahead of and behind the vehicle.

The road condition may be determined to be moist if the front end air moisture value represents approximately 100% air moisture, for example, between 90% and 100%, and the rear end air moisture value represents approximately 100% air moisture, for example, between 90% and 100%. If another vehicle is travelling ahead of the vehicle and stirs up spray water, then the air ahead of and behind the vehicle is generally saturated with moisture. 100% air moisture ahead of the vehicle is a highly probable indication that the road is at least moist or wet. This piece of information may be utilized to check the plausibility of, and to ensure, a road condition, which has been determined with another method or with other sensors.

The front end air moisture value may be determined using at least one ultrasonic sensor situated at the front end of the vehicle. The rear end air moisture value may be determined using at least one ultrasonic sensor situated at the rear end of the vehicle. An attenuation of sound waves in air is a function of the air moisture. The sound velocity on the other hand is essentially a function of an air temperature. The air temperature may be easily detected on the vehicle. A distance to the object may be calculated via the sound velocity and a propagation time of sound waves from an ultrasonic sensor to an object and back. An expected intensity of an echo from the object may be determined using the distance and an expected attenuation. If the echo exhibits an actual intensity that is lower than the expected intensity, the sound waves in the air are attenuated more strongly than with the expected attenuation. The actual attenuation may be determined from a ratio of the expected intensity to the actual intensity. The attenuation may be used to deduce air moisture.

The front end air moisture value may be determined using an air moisture sensor situated at the front end of the vehicle. The rear end air moisture value may be determined using an air moisture sensor situated at the rear end of the vehicle. An air moisture sensor, for example, may be situated in an intake tract of an engine of the vehicle, in particular, for the measurement at the front end of the vehicle. The air moisture sensor may also be a discrete device.

The piece of road condition information may further be determined using a correction factor for the rear end air moisture value and/or for the front end air moisture value. The correction factor may be adjusted if the front end air moisture value indicates a higher air moisture than the rear end air moisture value. Since the air moisture in a volume of air remains generally unchanged or also increases with wetness if the vehicle passes the volume of air, an erroneously identified air moisture may be assumed, if at the rear end a lower air moisture is identified than at the front end.

To obtain correct values in the future, the correction factor may be determined and used in the future.

The method may, for example, be implemented in software or in hardware or in a mixed form of software and hardware, for example, in a control unit.

The approach presented herein further provides a device, which is designed to carry out, activate or implement the steps of a variant of the method presented herein in corresponding units.

The device may be an electrical unit, including at least one processing unit for processing signals or data, at least one memory unit for storing signals or data, and at least one interface and/or a communication interface for reading in or outputting data that are embedded in a communication protocol. The processing unit may, for example, be a signal processor, a so-called system ASIC or a microcontroller for processing sensor signals and for outputting data signals as a function of the sensor signals. The memory unit may, for example, be a flash memory, an EPROM or a magnetic memory unit. The interface may be designed as a sensor interface for reading in the sensor signals from a sensor and/or as an actuator interface for outputting the data signals and/or control signals to an actuator. The communication interface may be designed to read in or output the data in a wireless and/or hardwired manner. The interfaces may also be software modules, which are present, for example, in a microcontroller, in addition to other software modules.

Also advantageous is a computer program product or computer program, including program code, which may be stored on a machine-readable carrier or memory medium, such as a semiconductor memory, a hard disk memory or an optical memory and is used for carrying out, implementing and/or activating the steps of the method according to one of the previously described specific embodiments, in particular, when the program product or program is executed on a computer or on a device.

It is noted that some of the possible features and advantages of the present invention herein are described with reference to different specific embodiments. Those skilled in the art recognize that the features of the device and of the method may be suitably combined, adapted or substituted in order to arrive at additional specific embodiments of the present invention.

BRIEF DESCRIPTION OF THE DRAWING

Specific embodiments of the present invention are described below with reference to the FIGURE, neither the FIGURE nor the description are to be interpreted as limiting the present invention.

FIG. 1 shows a depiction of a vehicle that includes a device according to one exemplary embodiment.

The FIGURE is merely schematic and not true to scale. Identical reference numerals in the FIGURE refer to identical or equivalent features.

DETAILED DESCRIPTION OF EXAMPLE EMBODIMENTS

FIG. 1 shows a depiction of a vehicle 100, including a device 102 according to one exemplary embodiment. Vehicle 100 includes a front device 104 at its front end for determining a front end air moisture value 106. The front end air moisture value 106 represents air moisture of the air at the front end. Vehicle 100 includes a rear device 108 at its rear end for determining a rear end air moisture value 110. Rear end air moisture value 110 represents air moisture of the air at the rear end. Device 102 is designed to carry out a method according to the present invention presented herein for identifying an instantaneous road condition. Device 102 reads in front end air moisture value 106 and rear end air moisture value 110 and determines a piece of road condition information 112 representing the road condition using the air moisture at the front end and the air moisture at the rear end.

Vehicle 100 in this case is traveling on a wet road. Presently, no other vehicle is traveling on a section of road ahead of vehicle 100 nor is any oncoming traffic generating spray and water turbulences. When rolling on the roadway surface, tires of vehicle 100 displace water from the roadway surface into a structure of a pavement of the road, into a profile of the tires or as spray toward the front or toward the side. The water in the profile and the water from the structure are also pulled partly as spray upwardly behind the tire. Air turbulences under, next to and behind vehicle 100 carry the spray, in particular, upwardly behind vehicle 100, where a spray trail is formed and slowly drops to the ground again. A surface of the water is reproduced by the spray. The water evaporates above the large surface until the air moisture is high. The water may, in particular, evaporate until the air is saturated.

The air moisture at the front end corresponds essentially to ambient air moisture. The air moisture at the rear end is significantly higher as a result of the spray. Based on this difference, device 102 identifies the road condition as wet and displays the identified road condition in the piece of road condition information 112. If rear end air moisture value 110 at the rear end indicates air moisture that is significantly lower than that indicated by front end air moisture value 106 at the front end, an identification error may then be assumed, since realistically the air moisture may drop only minimally from the front end to the rear end. The difference between front end air moisture value 106 and rear end air moisture value 110 may be detected and used as a correction factor with a reversed sign in the case of future road condition determinations.

If another vehicle is traveling ahead of vehicle 100, or if crosswind pushes spray trails of the oncoming traffic into the lane of vehicle 100, the air moisture at the front end is also very high. Device 102 identifies the road condition to be at least as moist even in the case of very high air moisture in front and in back or at the front end and at the rear end.

Since the spray behind vehicle 100 generates moist air with air moisture approximating saturation, the device identifies the road condition to be at least no longer wet if the relative air moisture at the rear end is less than 100%, in particular, less than 50%. In this case, a tolerance range may be used in order to avoid erroneously signaling a dry road in the case of minimal fluctuations in the range of saturation.

In one exemplary embodiment, front device 104 includes at least one ultrasonic sensor 114 situated at the front end for determining front end air moisture value 106. The air moisture is determined via an attenuation of the emitted ultrasound.

In one exemplary embodiment, rear device 108 includes at least one ultrasonic sensor 114 situated at the rear end for determining rear end air moisture value 110. The air moisture is determined via an attenuation of the emitted ultrasound.

Air moisture sensors 116 with different measuring principles may also be used instead of ultrasonic sensors 114 in order to determine air moisture values 106, 110.

In other words, in the approach presented herein, a moist road is identified at low speed with the aid of an air moisture measurement, for example, using ultrasound.

The air moisture may be measured with the aid of the ultrasonic system of the vehicle. In addition, a moist road may be distinguished from a wet road with the aid of the noise level, a high vehicle speed being advantageous in this case. A wet road may also be distinguished from a dry road with the aid of the disturbance in the ultrasonic signals, a low vehicle speed being advantageous for this purpose.

With the approach presented herein, it is possible to distinguish a moist road from a dry road even at low speed. Conventional methods may be checked for plausibility or diagnosed.

The ultrasonic sensors measure the air moisture ahead of and behind the vehicle. If the air moisture is very high (close to 100%) in front and in the rear or if the air moisture is higher in the rear than in the front, then this is attributable to a moist road. If the air moisture in front and in the rear is the same and less than 100%, then a dry road may be assumed.

It is important in terms of the friction coefficient that the road is not erroneously identified as dry. The road is therefore identified as dry only when the method presented herein or at least one other method identifies no moist or wet road.

The air moisture measurement is regularly checked for plausibility and corrected in the case of implausible results, since a roadway erroneously identified as dry may have dangerous consequences. For example, the moisture calculation of the rear sensors is corrected upwardly for the future if the air moisture in the front is higher than in the rear. Alternatively or in addition, the moisture calculation of the front sensors is corrected downwardly for the future.

If the air moisture is very low in the front and in the rear (for example, <50%) and, as a result thereof, a dry roadway may be assumed, it is then assumed that the air moisture is the same in the front and in the rear. The moisture calculation of the sensors that provides the lower result is therefore corrected upwardly. Alternatively or in addition, the moisture calculation of the sensors that provides the higher result, is corrected downwardly.

If additional sensors of the host vehicle or of preceding vehicles are able to reliably measure the air moisture, then in the case of implausible measurements with the on-board sensors, the calculations may be corrected with the aid of reliable air moisture values.

At high speed, a slightly moist road may be distinguished from a dry road with the approach presented herein, even if the identification is no longer possible based on the noise level.

At low speed, a moist road may be distinguished from a dry road with the approach presented herein, even if the distinction is no longer possible based on the disturbance of the signal.

The measuring methods may be checked for plausibility with the aid of the noise level and of the disturbance of the signal. A road erroneously identified as moist or wet may be diagnosed in this manner.

Alternatively, the air moisture may also be measured with a moisture sensor system, which may be situated, for example, in the intake tract of an internal combustion engine, or with the aid of radar and LIDAR. Air moisture has an attenuating effect on infrared radiation and radar radiation.

Finally, it should be noted that terms such as "including", "encompassing", etc. do not preclude other elements or steps and terms such as "a" do not preclude plurality. Reference numerals are not be considered as a limitation.

What is claimed is:

1. A method of a wet road warning system of a vehicle, the method comprising:
   obtaining, by a processor of the system and from a first sensor that is arranged at a front side of the vehicle, a front end air moisture value representing a degree to which air at a front end of the vehicle is saturated with moisture;
   obtaining, by the processor and from a second sensor that is arranged at a rear side of the vehicle, a rear end air moisture value representing a degree to which air at a rear end of the vehicle is saturated with moisture;
   based on the front end air moisture value and the rear end air moisture value, determining by the processor whether a road on which the vehicle is traveling is dry; and
   in response to a result of the determination being that the road is not dry, the processor displaying a warning that the road on which the vehicle is traveling is wet.

2. The method as recited in claim 1, wherein the road condition is determined to be dry when the rear end air moisture value and the front end air moisture value are approximately equal to each other and each of the rear end air moister value and the front end air moisture value represent an air moisture of less than 100%.

3. The method as recited in claim 1, wherein the road condition is determined to be moist when the front end air moisture value represents approximately 100% air moisture and the rear end air moisture value represents approximately 100% air moisture.

4. The method as recited in claim 1, wherein the first sensor and/or the second sensor is a respective ultrasonic sensor.

5. The method as recited in claim 1, wherein at least one of the front end air moisture value and the rear end air moisture value is adjusted by a correction value in response to a prior determination that the front end air moisture value is higher than the rear end air moisture value.

6. A device of a wet road condition warning system of a vehicle, the device comprising:
   a first sensor arranged at a front side of the vehicle;
   a second sensor arranged at a rear side of the vehicle;
   a display; and
   a processor communicatively coupled to the first sensor and the second sensor, wherein the processor is configured to:
      obtain from the first sensor a front end air moisture value representing a degree to which air at a front end of the vehicle is saturated with moisture;
      obtain from the second sensor a rear end air moisture value representing a degree to which air at a rear end of the vehicle is saturated with moisture;
      based on the front end air moisture value and the rear end air moisture value, determine whether a road on which the vehicle is traveling is dry; and
      in response to a result of the determination being that the road is not dry, outputting on the display a warning that the road on which the vehicle is traveling is wet.

7. A non-transitory machine-readable memory medium on which is stored a computer program that is executable by a processor of a wet road warning system and that, when executed by processor, causes the processor to perform a method, the method comprising:
   obtaining, from a first sensor that is arranged at a front side of the vehicle, a front end air moisture value representing a degree to which air at a front end of the vehicle is saturated with moisture;

obtaining, from a second sensor that is arranged at a rear side of the vehicle, a rear end air moisture value representing a degree to which air at a rear end of the vehicle is saturated with moisture;

based on the front end air moisture value and the rear end air moisture value, determining whether a road on which the vehicle is traveling is dry; and in response to a result of the determination being that the road is not dry, displaying a warning that the road on which the vehicle is traveling is wet.

8. The method as recited in claim 1, wherein, for the determination of whether the road on which the vehicle is traveling is dry, the processor compares the rear end air moisture value and the front end air moisture value to each other.

9. The method as recited in claim 8, wherein the processor determines the road not to be dry in response to the rear end air moisture value being higher than the front end air moisture value.

10. The method as recited in claim 8, wherein the processor is configured to determine that the road is dry in response to a combination of both (a) a determination that the rear end air moisture value is not higher or higher by a threshold amount than the front air moisture value and (b) the front end air moisture value and the rear end air moisture value both not being a 100% moisture saturation value.

11. The method as recited in claim 8, wherein the processor is configured to determine that the road is not dry additionally if both the rear end air moisture value and the front end air moisture value are 100% moisture saturation values.

12. The method as recited in claim 1, wherein the processor:
(a) is configured to determine that the road is not dry in response to a determination that the rear end air moisture value and the front end air moisture value are not at least a predetermined high moisture saturation value but the rear end moisture value is higher or higher by a threshold amount than the front end moisture value; and
(b) is configured to determine that the road is not dry in response to a determination that the front end air moisture value and the rear end air moisture value are both at least the predetermined high moisture saturation value, even when the rear end moisture value is not higher than the front end air moisture value.

13. The method as recited in claim 12, wherein the processor is configured to determine that the road is dry in response to a combination of (a) a determination that the front end air moisture value and the rear end moisture value are not at least the predetermined high moisture value and (b) a determination that the rear end air moisture value is not higher or not higher by at least the predetermined threshold amount than the front end air moisture value.

* * * * *